United States Patent [19]

Iacoviello

[11] 4,239,563

[45] Dec. 16, 1980

[54] PROCESS FOR THE USE OF VINYL ACETATE-ETHYLENE COPOLYMER EMULSIONS TO ADHERE FIBERS TO CARPET BACKING

[75] Inventor: John G. Iacoviello, Somerville, N.J.

[73] Assignee: Air Products and Chemicals, Inc., Allentown, Pa.

[21] Appl. No.: 72,747

[22] Filed: Sep. 5, 1979

Related U.S. Application Data

[60] Continuation of Ser. No. 866,984, Jan. 5, 1978, abandoned, which is a continuation-in-part of Ser. No. 505,962, Sep. 16, 1974, abandoned, which is a division of Ser. No. 195,018, Nov. 2, 1971, abandoned.

[51] Int. Cl.$^3$ ............................................. B32B 27/04
[52] U.S. Cl. ..................................... 156/72; 156/332; 260/29.6 RB; 260/29.6 T; 427/372.2; 427/385.5; 427/389.9; 428/95; 428/96; 428/97; 526/331
[58] Field of Search .......................... 156/72, 435, 332; 428/97, 96, 95, 522; 260/29.6 RW, 29.6 TA, 29.6 NA, 17 R, 29.6 T, 29.6 RB; 526/331; 427/372 R, 385 R, 390 R, 394

[56] References Cited

U.S. PATENT DOCUMENTS

| | | | |
|---|---|---|---|
| 3,679,469 | 7/1972 | Moore | 428/97 |
| 3,716,504 | 2/1973 | Lindemann et al. | 260/29.6 TA |
| 3,739,567 | 6/1973 | Williamson | 57/153 |
| 3,779,799 | 12/1973 | Kennedy et al. | 428/97 |
| 3,779,992 | 12/1973 | Liu et al. | 526/331 |

*Primary Examiner*—Michael W. Ball
*Attorney, Agent, or Firm*—Richard A. Dannells, Jr.; E. Eugene Innis

[57] ABSTRACT

Use of vinyl acetate-ethylene copolymer emulsions as laminating adhesives for rug backing is disclosed. The copolymer emulsions are prepared by admixing vinyl acetate-ethylene copolymer, dispersant and thickening agent together, with or without the addition of filler. The vinyl acetate-ethylene copolymer can contain between about 20 and about 70 parts by weight of vinyl acetate and between about 30 and about 80 parts by weight of ethylene. The resulting vinyl acetate-ethylene copolymer emulsions have a glass transition temperature ($T_g$) of between about $-35°$ C. and about $-10°$ C.

7 Claims, No Drawings

… …

4,239,563

PROCESS FOR THE USE OF VINYL ACETATE-ETHYLENE COPOLYMER EMULSIONS TO ADHERE FIBERS TO CARPET BACKING

CROSS-REFERENCE TO RELATED APPLICATIONS

This application is a continuing application of Ser. No. 866,984, filed Jan. 5, 1978, and now abandoned, which was a continuation-in-part of application Ser. No. 505,962, filed Sept. 16, 1974, and now abandoned, which was a divisional of application Ser. No. 195,018, filed Nov. 2, 1971 and now abandoned.

BACKGROUND OF THE INVENTION

The present invention relates to improved adhesives for use with rugs and carpets. More particularly, the present invention relates to the use of low cost vinyl acetate-ethylene copolymer emulsions having a $T_g$ between about $-35°$ C. and about $-10°$ C. as laminating adhesives for rugs and carpets.

Adhesive compositions are essential to the structure of rugs and carpets. Tufted synthetic yarn could not function as a carpet without the presence of a latex adhesive to laminate a secondary fabric, such as jute or burlap, to the tufted primary fabric, which can also be jute or burlap. The latex adhesive functions to lock the tufts as well as bond the secondary fabric to the primary tufted material. Resins for this use are preferably applied in emulsion form to reduce costs and aid in controlling penetration into the textile fibers. To meet economic considerations such resins must be made as inexpensively as possible.

Basically, one of two types of backing construction is used by the industry today: (a) a secondary fabric is laminated by the use of latex adhesive to the primary fabric or (b) a foamed latex layer is applied directly over the fiber locking adhesive, which when dried and cured creates a sponge cushion as an integral part of the completed carpet. For either type of backing construction the resin employed as the latex adhesive must maintain its flexibility after application and not become either brittle or soft and tacky.

Double-backed tufted carpets are generally made by looping threads of pile fibers through an inexpensive woven or unwoven textile base, known as the primary substrate. The thread is looped through the primary substrate in one continuous length constituting a complete row of pile in the carpet. The thread is pulled tightly against the underside of the primary substrate, but the loops can remain connected or be severed, depending on whether a loop pile or a cut pile carpet is desired. The pile fibers are then anchored to the primary substrate in this arrangement by the application of adhesive. The double-backed tufted carpet is completed by applying to the wet underside of the primary substrate a further backing material known as the secondary fabric or as scrim. The scrim, which serves to improve the dimensional stability and appearance of the carpet, is normally adhered to the underside of the primary substrate by means of the same adhesive which serves to anchor the pile fibers to the primary substrate. The resulting laminate of primary substrate having pile fibers looped through it, an adhesive and scrim constitutes the double-backed carpet.

Currently, carboxylated styrene-butadiene copolymers are mainly employed as laminating adhesives for rugs and carpets and have to a very great degree replaced natural rubber for such applications. Synthetic latex prepared from carboxylated styrene-butadiene polymers have several important disadvantages. One of the disadvantages of the conventional carboxylic styrene-butadiene latex adhesives is that they have a strong odor of ammonia associated with them. In addition, finished carpets often have a heavy and unpleasant odor of styrene. Carboxylated butadiene-styrene polymer adhesives can also contain some residual unsaturation which tends to cause unsatisfactory aging characteristics and result in a loss of flexibility. In fact, polymerization which occurs as a result of such residual unsaturation has caused the backing of rugs and carpets to become as stiff as a board after only a few years.

The advent of certain synthetic materials in the carpet industry which permit a carpet to be used both indoors and outdoors has given rise to further problems in connection with the preparation of carpeting. Polypropylene is a relatively cheap material which in most respects is quite satisfactory for use as the pile fiber, the primary substrate and the scrim or secondary substrate of a carpet. However, polypropylene presents an adhesion problem since latex compositions normally employed in carpet manufacture do not adhere well to the surface of polypropylene. Carpets prepared using polypropylene and conventional latex compounds have been subject to delamination of the scrim secondary substrate. In order to overcome this problem, it has been suggested that multiple intervening adhesive layers be employed resulting in increased production costs.

SUMMARY OF THE INVENTION

An object of the present invention is to provide improved adhesive compositions for rug and carpet backing applications.

Another object of the present invention is to provide low cost adhesive compositions for carpet backing applications which have improved characteristics compared to conventional laminating adhesives.

A further object of the present invention is to provide vinyl acetate-ethylene copolymer emulsions which can be used as carpet backing adhesives.

Still a further object of the present invention is to provide low cost vinyl acetate-ethylene copolymer carpet backing adhesives which have excellent adhesion with respect to both synthetic and natural materials, good resistance to aging and essentially no continuing odor characteristics.

Yet another object of the present invention is to provide carpet backing adhesives prepared from vinyl acetate-ethylene copolymer emulsions which can be loaded to a high filler level and still maintain good adhesion characteristics and excellent cold crack resistance.

Even a further object of the present invention is to provide carpet backing adhesives prepared from copolymer emulsions based on vinyl acetate and ethylene which have a glass transition temperature ($T_g$) of between about $-35°$ C. and about $-10°$ C.

In accordance with the present invention, soft, copolymer emulsions based on vinyl acetate and ethylene are prepared which can be used as carpet backing adhesives and which have a glass transition temperature ($T_g$) of between about $-35°$ C. and about $-10°$ C. The amount of vinyl acetate in the copolymer emulsion is between about 20 and 70 parts by weight and the corresponding amount of ethylene in the copolymer is between 30 and about 80 parts by weight.

Vinyl acetate-ethylene copolymer emulsions are then prepared with thickening agent and dispersant. The vinyl acetate-ethylene copolymer emulsions can also be compounded with one or more conventional latex compounding ingredients such as fillers, defoaming agents, tackifiers, etc. If desired, between 0 and 500 parts by weight of filler per 100 parts by weight of resin can be included in the copolymer emulsions.

The resulting copolymer emulsions provide improved carpet backing adhesives having advantageous adhesion, resistance to ageing, improved odor characteristics, good compatibility with dyes and low cost. Moreover, the copolymer emulsions of the present invention can be applied using conventional equipment.

DESCRIPTION OF THE PREFERRED EMBODIMENTS

In accordance with the present invention, soft copolymer emulsions based on vinyl acetate and ethylene are prepared for use as carpet backing adhesives. The copolymer emulsions contain thickening agent and dispersant and can additionally contain such suitable additives as filler.

Broadly, the amount of vinyl acetate present in the copolymer is between about 20 and about 70 parts by weight with the corresponding amount of ethylene present in the copolymer being between about 30 and about 80 parts by weight. A particularly preferred copolymer contains about 65 parts by weight of vinyl acetate and about 35 parts by weight of ethylene. The resulting copolymer emulsions have a glass transition temperature ($T_g$) of between about $-35°$ C. and about $-10°$ C. The glass transition temperature, referred to as the $T_g$, is the temperature above which a polymeric material exhibits rubbery characteristics.

Conventional thickening agents such as sodium polyacrylates, and hydroxyethyl cellulose can be employed in an amount between about 0.1 part and about 4 parts per hundred parts of resin. A dispersant or deflocculating agent such as tetrasodium pyrophosphate can be employed in the amount of about 0.1 part to about 3 parts by weight per hundred parts of resin.

In addition, conventional fillers such as hydrous silicates of alumina, titanium dioxide, aluminum hydroxide, calcium carbonate and barium sulfates can be employed in amount between 0 and about 500 parts by weight per hundred parts of resin. Since the copolymer emulsions of the present invention can be loaded to an exceptionally high filler level, in excess of 400 parts by weight based on 100 parts of resin, a significant economic advantage can be obtained using relatively large amounts of inexpensive filler in the copolymer emulsion formulations. Even with a very high level of filler, the copolymer emulsions still exhibit good adhesion and cold crack resistance. The fact that high filler levels can be employed also means that improved fire retardance properties can be obtained.

Minor amounts of other conventional additives such as stabilizers, pigments such as titanium oxide and lithopone, and defoamers can also be included in the copolymer emulsions. The copolymer emulsions can be prepared with or without surfactant. When polyvinyl alcohol, for example, is employed as a protective colloid during the copolymerization it is not necessary to add a surfactant. If such a protective colloid is not employed, a surfactant such as a non-ionic or anionic surfactant can be employed. Antioxidants, however, are not required in contrast to the necessity for antioxidants in conventional styrene-butadiene copolymer emulsions.

Conventional and well-known emulsion polymerization techniques can be employed for preparing the vinyl acetate-ethylene copolymer emulsions of the present invention. It is sometimes advantageous to incorporate minor amounts (i.e., up to about 5% by weight) of one or more other monomers with the vinyl acetate-ethylene comonomers. Examples of monomers which can be added include monomers such as maleic acid in an amount from 0 to about 1% by weight and triallyl cyanurate in an amount from 0 to about 0.3% by weight.

Similarly, conventional application techniques can be employed, i.e., the same application techniques employed for styrene-butadiene resins. The adhesive compositions can be applied to the underside of the pile fiber primary substrate composite by means of a kiss-roller, the use of which is common in conventional carpet backing processes to coat or impregnate the jute fibers of the primary substrate and wipe off the excess emulsion. Other suitable methods of application can, of course, by used, such as spreading with a doctor blade, spraying, etc. The amount of latex applied is normally just sufficient to obtain adequate adhesion of the pile fibers to the primary substrate. Excess emulsion material can, of course, be used, but is wasteful and necessitates longer drying times by infrared lamps or hot air ovens or a combination of both. Conventional coating weights on carpets can be used. Typically, the coating weights will vary from about 23 to about 37 ounces per square yard. The method of applying rug backing compositions to various types of carpeting material can vary from company to company. Some companies prefer to use a rug backing composition with a working viscosity of 12,000 to 15,000 centipoises. Other companies prefer to use lower viscosities in the neighborhood of 2000 centipoises. The filler levels will also normally vary from company to company from about 100 parts to about 325 parts based on 100 parts of polymer.

The vinyl acetate-ethylene copolymers prepared in accordance with the present invention can be applied to carpets made from any of the usual fibers, such as nylon, acrilan, polyester and wool, and can be used with all normal backing materials, including jute and polypropylene. The vinyl acetate-ethylene copolymer emulsions have a very definite advantage as laminating adhesive for indoor-outdoor carpeting made from polypropylene, overcoming the particularly acute problem of delamination which has been associated with polypropylene carpeting.

Some of the important characteristics of laminating adhesives are determined by the so-called T-peel, tuft lock and pill tests.

T-peel is a value obtained when the secondary backing is pulled away from the primary backing and is determined by using a Scott tester. Adhesion of the scrim or secondary backing to the primary substrate is referred to as the "peel strength". This term is used in its normal sense in the carpet manufacturing industry, to mean the force required to peel apart a strip of the two adhered components two inches wide which have been aged 24 hours. It is measured by gripping one of the components in each jaw of the Scott tensile tester and then moving the jaws apart at a rate of 2 inches per minute. A value of between 8 and 40 pounds is normally obtained. Normally, the lighter the coating weight the lower the T-peel.

Tuft lock is a determination of the ability of a rug backing composition to hold fiber to both the primary and secondary backing. Tuft lock is determined by using a Scott tester to pull on a section of the fiber and measuring the force required to pull the fiber away from the structure. Normally, values for styrene-butadiene rubber latex will vary from 10 to 30 pounds of pull. At 35 pounds of pull, yarns used in the carpeting usually break.

Pill test or bundle wrap is a determination of the ability of the rug backing composition to completely enclose the individual fibers. Should the fibers in the construction not be completely enclosed, mild rubbing of the carpet produces loose strands of fiber which tend to form into a small ball of fiber or a "pill".

The invention will be illustrated by the following examples, it being understood that there is no intention to be necessarily limited by any details thereof since variations can be made within the scope of the invention. Physical characteristics of the vinyl acetate-ethylene copolymer which are referred to below and which are not identified by any previously mentioned testing method, are determined by conventional standard tests. In the examples, all parts are by weight unless otherwise indicated.

EXAMPLE I

A vinyl acetate-ethylene copolymer emulsion protected with polyvinylalcohol was prepared by emulsion copolymerization so as to contain vinyl acetate and ethylene in the following percentages:

| | |
|---|---|
| Vinyl acetate (by saponification) | 63.8% |
| Ethylene (difference) | 36.2% |

Employing the aforementioned vinyl acetate-ethylene copolymer, a copolymer emulsion having a $T_g$ of $-20$ degrees C. was prepared in accordance with the following recipe for 55 gallon basic rug backing:

| Solids | Ingredients | Dry Pounds | Wet Pounds |
|---|---|---|---|
| 51.0% | Vinyl acetate-ethylene copolymer | 120 | 235 |
| | Ammonium hydroxide | 0 | 1.8 |
| | Water | 0 | 62 |
| 5% | Tetrasodium pyrophosphate | 0.6 | 12.0 |
| 100% | Defoamer | 0.6 | 0.6 |
| 100% | Calcium carbonate | 390 | 390 |
| 12.0% | Thickener (polyacrylic acid type) | 1.3 | 11.0 |

In comparison to the viscosity of butadiene-styrene compounds which is normally in the range of 13,000 to 15,000 centipoises, the viscosity of the emulsion prepared in accordance with the above procedure was approximately 17,000 to 20,000 centipoises.

9000 linear feet of 12 foot width carpeting was prepared. The primary and secondary backings were jute, the fiber was nylon of different constructions, viz., shag, cut pile and regular. Machine speeds were adjusted to their normal 15 feet per minute for the application of the copolymer emulsion adhesive.

The resulting carpeting had excellent adhesion. The T-peel strengths were much greater than generally obtained with the normal carboxylated styrene-butadiene materials. Tuft lock values were normally 5 pounds better than the average carboxylated styrene-butadiene latex materials. Pill tests indicated that 90 to 100% bundle wrap was obtained on all fibers.

In addition to its other advantages, the vinyl acetate-ethylene copolymer emulsion was compounded with ease. In addition, viscosity stability was excellent for longer periods of time. Both the copolymer emulsion and the final carpeting were odorless, in direct contrast to butadiene-styrene latices which usually have an ammoniacal odor and which leave carpeting with an objectionable odor of styrene for long periods of time. Pot life studies indicated that the ethylene-vinyl acetate copolymer emulsions had excellent stability. These pot life studies also demonstrated that essentially the same characteristics were present after 7 days as were present after 4 days.

EXAMPLE II

In accordance with the procedure of this example, the partial delayed addition of vinyl acetate monomer was used to prepare vinyl acetate-ethylene copolymer emulsion containing 0.5% maleic acid and 0.15 triallylcyanurate using anionic surfactants.

10% of the vinyl acetate and all of the surfactants were added to the reaction immediately. $3\frac{1}{2}$ weight percent of anionic surfactant was added based on the total weight of the principal monomers. The charge to the 1000 pounds per square inch pressure kettle included 4 pounds of vinyl acetate, 11 pounds 6 ounces of anionic surfactant, 172 grams of sodium vinyl sulfonate (25%), 185 grams of ferrous ammonium sulfate, and 42 pounds of deionized water.

The reactants charged to the pressure kettle were purged twice with 20 pounds per square inch of nitrogen and twice with 20 pounds per square inch of ethylene while stirring at 200 revolutions per minute. The charge was then heated to 50 degrees C. The ethylene pressure was adjusted to 950 pounds per square inch and maintained at this pressure throughout the run. Polymerization was initiated with a 1% solution of sodium sulfoxylate formaldehyde consisting of: 50 grams of sodium sulfoxylate formaldehyde, 40 milliliters of ammonium hydroxide and 5000 milliliters of deionized water. Following the initiation of polymerization, two delayed additions were made over a three hour period, maintaining the vinyl acetate free monomer between 5 and 7%. The first delay comprised 36 pounds of vinyl acetate and 30 grams of triallyl cyanurate. The second delay comprised 130 grams of maleic anhydride, 185 grams of sodium vinyl sulfonate, 130 grams of $K_2S_2O_8$ and 1040 grams of deionized water. The reaction temperature was kept at 50 degrees C. with a cooling jacket temperature of 40 degrees C. for the first two hours and at 25 degrees C. for the remainder of the reaction. The emulsion pH was kept between 2.5 and 3.0. A 5% sodium sulfoxylate formaldehyde solution was used after the first hour of reaction time. That solution consisted of 250 grams of sodium sulfoxylate formaldehyde, 50 milliliters of ammonium hydroxide and 5000 grams of deionized water.

Upon completion of the two delayed additions and when the vinyl acetate free monomer level approached 2.0%, the emulsion was cooled to 30 to 34 degrees C., the pH of the emulsion was adjusted to 5.5, and the ethylene was vented from the reaction kettle. The emulsion was then transferred to a stripper and the remaining unreacted vinyl acetate polymerized under atmospheric conditions to less than 0.5%. A total of 205 grams $K_2S_2O_8$ catalyst and 60 grams of sodium sulfoxylate formaldehyde were used for the entire reaction.

The properties of the resulting emulsion are listed below.

| | |
|---|---|
| Free monomer | 0.4% |
| Viscosity | 40.2 centipoises at 60 revolutions per minute |
| | 46.0 centipoises at 12 revolutions per minute |
| $T_g$ | $-25°$ C. |
| Vinyl acetate | 61.2% (by saponification) |

EXAMPLE III

A vinyl acetate-ethylene copolymer emulsion containing 0.5% maleic acid and 0.15% triallyl cyanurate was prepared using non-ionic surfactants. A partially delayed monomer addition procedure was employed wherein 90% of the vinyl acetate was delayed. The maleic acid was totally delayed, while the non-ionic surfactants were added batchwise.

The following materials were charged to a 1000 pounds per square inch pressure reactor: 4.2 pounds vinyl acetate, 1730 grams of non-ionic surfactant, 180 grams of sodium vinyl sulfonate (25%), 200 grams of $K_2S_2O_8$, 0.5 grams of ferrous ammonium sulfate and 47 pounds of deionized water. The reactants were purged twice with 20 pounds per square inch of nitrogen and twice with 20 pounds per square inch of ethylene while stirring at 150 revolutions per minute. The charge was heated to 50 degrees C. and the ethylene pressure in the kettle was adjusted to 950 pounds per square inch and maintained at this pressure throughout the reaction. The polymerization was initiated with a 1% sodium sulfoxylate formaldehyde solution consisting of: 50 grams of sodium sulfoxylate formaldehyde, 40 milliliters of ammonium hydroxide and 5000 grams of water.

Upon initiation of the reaction, two delayed additions were made over a 4-hour period maintaining the vinyl acetate free monomer level between 6 and 10%. The first delay included 43 pounds of vinyl acetate and 51 grams of triallyl cyanurate. The materials added during the second delayed addition included 132 grams of deionized water, 968 grams of maleic acid (18%), 180 grams of sodium vinyl sulfonate (25%), and 40 grams of $K_2S_2O_8$. The reaction temperature was held at 53° C. with a cooling jacket temperature of 38° C. for the first two hours and 25° C. for the remainder of the reaction. The pH of the emulsion was kept between 2.5 and 3.0. A 5% solution of sodium sulfoxylate formaldehyde was added after the first hour of reaction. The solution consisted of 250 grams of sodium sulfoxylate formaldehyde, 150 grams of ammonium hydroxide and 5000 grams of deionized water.

Upon completion of the delayed additions, and when the vinyl acetate free monomer level was reduced to 2.0%, the emulsion was cooled to 30° C. to 34° C., ethylene was vented from the reaction vessel, and the emulsion was transferred to a stripper. The remaining unreacted vinyl acetate was polymerized under atmospheric conditions to less than 0.5%. There were consumed 240 grams of $K_2S_2O_8$ and 865 grams of sodium sulfoxylate formaldehyde for the entire polymerization. The final pH of the emulsion was adjusted to 5.5 with concentrated ammonium hydroxide.

The properties of the resulting emulsion are listed below:

| | |
|---|---|
| Solids Content | 55.0% |
| Free Monomer | 0.5% |
| Viscosity | 376 centipoises at 60 rpm and 920 centipoises at 12 rpm |
| $T_g$ | $-25.0°$ C. |
| Vinyl acetate | 63.5% (by saponification) |

EXAMPLE IV

A vinyl acetate-ethylene copolymer emulsion was prepared with non-ionic surfactants, 0.5% maleic acid and 0.15% of triallyl cyanurate in accordance with the procedure set forth in Example III.

The vinyl acetate-ethylene copolymer emulsion was prepared to have a solids content of 58.8 and, a percentage of free monomer of 0.4, a percentage of vinyl acetate of 67.5 (determined by saponification).

The properties of the resulting emulsion are listed below:

| | |
|---|---|
| Viscosity | 580 centipoises at 60 rpm and 1480 centipoises at 12 rpm |
| $T_g$ | $-19.0°$ C. |

EXAMPLE V

A vinyl acetate-ethylene emulsion protected with polyvinyl alcohol was prepared by emulsion copolymerization so as to contain vinyl acetate and ethylene in the following percentages:

| | |
|---|---|
| Vinyl Acetate (by saponification) | 65% |
| Ethylene (difference) | 35% |

A vinyl acetate-ethylene adhesive composition having a $T_g$ of $-20$ degrees C. was prepared from the aforementioned emulsion using the same procedure set forth under Example 1 above and the following recipe:

| Solids | Ingredients | Dry Grams | Wet Grams |
|---|---|---|---|
| 55.4% | Vinyl acetate-ethylene copolymer | 100 | 181 |
| | Water | 0 | 74 |
| 100% | Tetrasodium pyrophosphate | 0.5 | 0.5 |
| 100% | Defoamer | 0.5 | 0.5 |
| 100% | Calcium carbonate | 400 | 400 |
| 10% | Thickener (polyacrylic acid type) | 1.3 | 13 |

The viscosity of the copolymer emulsion adhesive prepared in accordance with the above procedure range from an initial value of 10,800 centipoises to 14,200 centipoises after 7 days.

The copolymer emulsion adhesive of this example was applied to a standard commercially available nylon carpet having a primary backing of polypropylene by pouring the adhesives onto the carpet, drawing a ⅛ inch steel rod across the adhesive and laminating a jute secondary backing to the adhesive-coated primary backing using 38 ounces of emulsion (dry basis) per square yard of carpet with a 7 pound roller. The resulting laminated carpet was dried for 5 minutes at room temperature and dried for 15 minutes in a circulating air oven at 275° F. The carpet was then aged for 24 hours at room temperature before testing.

The resulting carpeting was about the same as that produced in accordance with Example I and had excellent adhesion and T-peel strengths that were much greater than generally obtained with conventional carboxylated styrene-butadiene latices. Specifically, the dry and wet peel strengths of the carpeting of this example were 9.8 pounds and 1.3 pounds, respectively per two-inch width of carpet. The latter measurements were taken with a Instron tensile tester, which is a more sophisticated machine than the Scott tester used in Example 1. The wet T-peel (delamination) strength is measured in the same fashion as discussed above in connection with the Scott tester except that the carpet sample measuring 2 inches wide by 8 inches long was first immersed in water at room temperature for 10 minutes before testing for wet peel strength.

CONTROL 1

The same procedure that was followed in Example V was followed in this control except that in place of the 65% vinyl acetate −35% ethylene copolymer, a copolymer was used in the adhesive containing vinyl acetate and ethylene in the following percentages:

| | |
|---|---|
| Vinyl acetate (by saponification) | 55% |
| Ethylene (difference) | 45% |

The vinyl acetate-ethylene adhesive composition of this control had a $T_g$ of −30 degrees C. and was prepared using the same recipe of Example V. The resulting carpet employing this adhesive had a wet peel strength of only 0.35 pounds per two-inch width or approximately one quarter the strength of the carpeting of Example V which used as adhesive containing the particularly preferred copolymer having 10% less ethylene and 10% more vinyl acetate.

CONTROL 2

Again the same procedure was followed in this control that was followed in Example V and Control 1 except that a vinyl acetate-ethylene copolymer containing the following percentages was used in the adhesive formulation:

| | |
|---|---|
| Vinyl acetate (by saponification) | 80% |
| Ethylene (difference) | 20% |

Although the dry and wet peel strengths of the carpeting produced from the adhesive of this control were 9.4 pounds and 1.55 pounds, respectively for two-inch width of carpet, the Tg of the adhesive was only 0 degree C. which is outside of the range of −35° C. and −10° C. specified in the Summary of the Invention for the vinyl acetate-ethylene copolymers of the present invention.

On comparing the glass transition temperatures of the vinyl acetate-ethylene adhesives of Examples I through V with Controls 1 and 2 and the peel strengths of the corresponding carpets produced from these adhesives, one can readily see the criticality of their vinyl acetate-ethylene contents. The vinyl acetate contents of the adhesive compositions in the examples ranged from about 61% (actually 61.2% determined by saponification in Example II) to about 68% by weight (67.5% in Example IV). Correspondingly, the ethylene contents ranged from about 32% (actually 31.85% determined by difference in Example IV) to about 38% by weight (38.2% in Example II). The balance of other monomers of the adhesive compositions ranged from 0 (in Examples I and V) to about 0.7% by weight (0.65% in Examples III and IV).

From the foregoing, it will be seen that this invention is well adapted to obtain all of the ends and objects hereinabove set forth together with other advantages which are obvious and which are inherent to the system. The copolymer emulsions of the present invention offer several product advantages for carpet backing adhesive applications. The emulsions with a minimum solids percentage of 50 provide excellent tuft lock, bundle wrap and T-peel. The copolymer emulsions show good adhesion to varying substrates including polyester and facing yarn and primary backing made from polypropylene. Excellent performance is also obtained in the manufacture of shag carpeting, even at low levels of adhesive add-on. Since the copolymer emulsions can be loaded to a high filler level, in excess of 400 parts of filler per 100 parts of resin and still show good adhesion and cold crack resistance, the resulting copolymer emulsions are economical to use and have good fire retardant characteristics. Typically, styrene-butadiene polymers are loaded to a level below 325 parts of filler per 100 parts of resin. The copolymer emulsions have excellent mechanical stability. The resulting copolymer emulsions also have resistance to ageing and have been tested for over 500 hours with the Fadeometer test without failure. Moreover, the copolymer emulsions provide a good hand and also improved odor characteristics. They do not have the strong smell of ammonia associated with conventional adhesives and the finished carpet does not have a residual and heavy odor of styrene. The low ammonia content of the adhesives also provides good compatibility with dyes. Copolymer emulsions based on vinyl acetate and ethylene are also compatible with most thickeners, polyacrylates, gums, hydroxyethyl cellulose, etc. A very important advantage of the formulations is that a maximum of only 0.5% residual monomer is present substantially eliminating further polymerization. The copolymer emulsions can be utilized as carpet backing adhesive using conventional equipment designed for use with carboxylated butadiene-styrene adhesives and accordingly no additional capital investment is required when the copolymers are used in accordance with the present invention.

While emphasis has been placed on the utilization of the vinyl acetate-ethylene copolymer emulsions of the present invention for rug backing applications, it will be understood that said copolymers can be employed in other applications including applications involving the use of said copolymers as laminating adhesives for adhering multilayered fabric materials.

Obviously, many other modifications and variations of the invention as hereinabove set forth may be made without departing from the spirit and scope thereof.

What is claimed is:

1. The process for adhering fibers to carpet backing which comprises applying a polymeric emulsion containing as the only adhesive polymeric component a vinyl acetate-ethylene copolymer consisting of between about 61 and about 68 parts by weight of vinyl acetate per hundred parts of said copolymer, between about 32 and about 38 parts by weight of ethylene per hundred parts of said copolymer and up to about 0.7 parts by weight of another monomer selected from the group consisting of maleic acid, triallyl cyanurate and mixtures thereof per hundred parts of said copolymer; a dispersant in an amount between about 0.1 part and about 3 parts per hundred parts of said copolymer; and a thickening agent in an amount between 0.1 part and about 4 parts per hundred parts of said copolymer to the carpet backing material, removing excess polymeric emulsion and drying the emulsion thereby causing the fibers to adhere to the carpet backing material; said emulsion having a glass transition temperature of between about −35° C. and about −10° C.

2. The process according to claim 1 wherein said vinyl acetate-ethylene copolymer contains about 65 parts by weight vinyl acetate and about 35 parts by weight ethylene.

3. The process according to claim 2 wherein said vinyl acetate-ethylene copolymer contains about 65 parts by weight vinyl acetate and about 35 parts by weight ethylene.

4. In the process of structuring rugs and carpets by adhering pile material to at least one backing substrate with an adhesive, the improvement comprising using as the adhesive a polymeric latex containing:
   (1) as the only adhesive polymeric component a vinyl acetate-ethylene copolymer consisting of between 61 and 68 parts by weight of vinyl acetate per hundred parts of said copolymer, between 38 and 32 parts by weight of ethylene per hundred parts of said copolymer and up to about 0.7 parts by weight of another monomer selected from the group consiting of maleic acid, triallyl cyanurate and mixtures thereof per hundred parts of said copolymer;
   (2) a dispersant in an amount between about 0.1 part and about 3 parts by weight per hundred parts by weight of said copolymer;
   (3) a thickening agent in an amount between about 0.1 part and about 4 parts by weight per hundred parts by weight of said copolymer; and
   (4) a filler in an amount from 0 to about 500 parts by weight per hundred parts by weight of said copolymer;
said adhesive having a glass transition temperature of between about −35° C. and about −10° C.

5. The process according to claim 4 wherein said filler is present in an amount in excess of 400 parts by weight per hundred parts by weight of vinyl acetate-ethylene copolymer.

6. The process according to claim 4 wherein said vinyl acetate-ethylene copolymer has a maximum residual monomer percentage of 0.5%.

7. The process according to claim 4 wherein said latex comprises a non-ionic copolymer emulsion having a minimum vinyl acetate-ethylene copolymer solids content of 50%.

* * * * *